United States Patent [19]

Petralia

[11] Patent Number: 5,449,182
[45] Date of Patent: Sep. 12, 1995

[54] UNIVERSAL SUBSTRATE HOLDING APPARATUS

[75] Inventor: Richard C. Petralia, Rochester, N.Y.

[73] Assignee: Xerox Corporation, Stamford, Conn.

[21] Appl. No.: 233,673

[22] Filed: Apr. 26, 1994

[51] Int. Cl.⁶ .......................... B23B 31/40; B66C 1/56
[52] U.S. Cl. .................. 279/2.08; 242/571.2;
                                      279/137; 294/98.1
[58] Field of Search ................ 279/2.08, 137;
           294/98.1, 119.3; 242/571.1, 571.2; 414/746.5,
                                                    910

[56] References Cited

U.S. PATENT DOCUMENTS

| | | | |
|---|---|---|---|
| 3,777,875 | 12/1973 | Sobran | 198/131 |
| 3,945,486 | 5/1976 | Cooper | 198/179 |
| 4,680,246 | 7/1987 | Aoki et al. | 430/133 |
| 4,783,108 | 11/1988 | Fukuyama et al. | 294/98.1 |
| 5,282,888 | 2/1994 | Fukawa et al. | 118/500 |

FOREIGN PATENT DOCUMENTS

| | | | |
|---|---|---|---|
| 0048191 | 2/1990 | Japan | 294/98.1 |
| 404023797 | 1/1992 | Japan | 294/98.1 |

OTHER PUBLICATIONS

"Airpicker ® Airgripper ™ Pneumatic Working Devices for Firm Precise Holding" Firestone Industrial Company.

*Primary Examiner*—Steven C. Bishop
*Attorney, Agent, or Firm*—Zosan S. Soong

[57] ABSTRACT

A universal substrate holding apparatus is disclosed comprising:

(a) a first core member having a top end and a bottom end;
(b) a first inflatable tube disposed around the first core member;
(c) a first passageway defined by the first core member in communication with the interior surface of the first tube;
(d) a second core member having a top end and a bottom end, a portion of the second core member having a larger outer cross-sectional dimension than the first core member, wherein the top end of the first member is associated with the bottom end of the second member;
(e) a second inflatable tube disposed around the second core member, a portion of the second tube having a larger outer cross-sectional dimension than the first tube, and whereby the second tube is disposed in tandem with the first tube; and
(f) a second passageway defined by the second core member in communication with the interior surface of the second tube.

10 Claims, 2 Drawing Sheets

5,449,182

UNIVERSAL SUBSTRATE HOLDING APPARATUS

This invention relates generally to an apparatus for internally holding a hollow substrate such as a cylindrical substrate suitable for use in the fabrication of a photoreceptor. More particularly, the invention pertains to a universal substrate holding apparatus employing a smaller chuck and an associated larger chuck in a tandem arrangement.

Known gripping devices are illustrated by the following documents, several of which disclose an inflatable member:

Fukuyama et al., U.S. Pat. No. 4,783,108, discloses a catching head of apparatus for handling parts.

A brochure (8 pages) titled "AIRPICKER® AIRGRIPPER ™ Pneumatic Working Devices for Firm and Precise Holding" from the Firestone Industrial Products Company, the disclosure of which is totally incorporated by reference, describes pneumatic working devices available under the tradename AIRPICKER®, which may be modified for embodiments of the instant invention.

Other gripping devices include Fukawa et al., U.S. Pat. Nos. 5,282,888; Aoki et al., 4,680,246; Cooper, 3,945,486; and Sobran, 3,777,875.

There is a need for new apparatus for internally holding hollow substrates which can grip substrates having differing dimensions.

SUMMARY OF THE INVENTION

It is an object in embodiments of the present invention to provide a substrate holding apparatus having a greater clearance between the substrate and the holding apparatus than attained by conventional chucks, which may reduce chucking failure due to for example poor chuck release.

It is a further object in embodiments of the present invention to reduce or minimize the changeover time needed to hold a substrate of a different cross-sectional dimension.

These objects and others are accomplished in embodiments by an apparatus comprising:

(a) a first core member having a top end and a bottom end;

(b) a first inflatable tube disposed around the first core member;

(c) a first passageway defined by the first core member in communication with the interior surface of the first tube;

(d) a second core member having a top end and a bottom end, a portion of the second core member having a larger outer cross-sectional dimension than the first core member, wherein the top end of the first member is associated with the bottom end of the second member;

(e) a second inflatable tube disposed around the second core member, a portion of the second tube having a larger outer cross-sectional dimension than the first tube, and whereby the second tube is disposed in tandem with the first tube; and (f) a second passageway defined by the second core member in communication with the interior surface of the second tube.

BRIEF DESCRIPTION OF THE DRAWINGS

Other aspects of the present invention will become apparent as the following description proceeds and upon reference to the Figures which represent preferred embodiments:

Unless otherwise noted, the same reference numeral refers to the same or similar feature. In embodiments of the instant invention, FIGS. 1-2 are substantially to scale.

DETAILED DESCRIPTION

Figure 1:
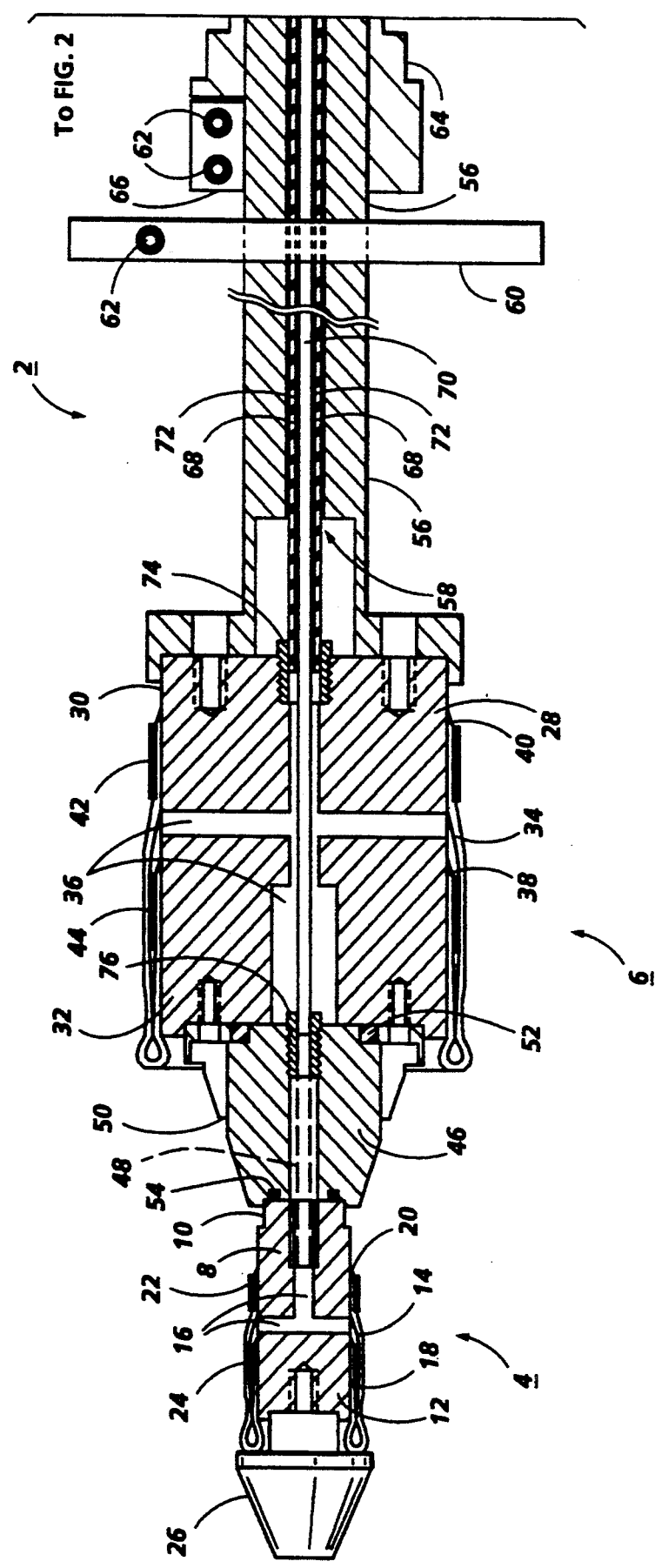
FIG. 1 illustrates a plan, schematic, cross-sectional view of the universal substrate holding apparatus.

In FIG. 1, universal substrate holding apparatus 2 is comprised of a first chuck 4 associated with a larger, tandem second chuck 6. The first chuck 4 is comprised of a first core member 8 having a top end 10 and a bottom end 12, a first inflatable tube 14 disposed around the first core member 8, a first passageway 16 defined by the first core member which is in communication with the interior surface of the first tube 14. The bottom end 18 of the first tube is folded back inwardly toward the top end 20 of the first tube to form a folded portion. The first chuck 4 further comprises means for hermetically coupling the top end 20 of the first tube to the first core member, such means including for example clamp ring 22, and means for hermetically coupling the bottom end 18 of the first tube to the first core member with the bottom end 18 of the first tube preferably being constrained only at the folded portion, such means including for example clamp ring 24. An optional conically-shaped guide member 26 is coupled to the bottom end 12 of the first core member. The guide member 26 may be coupled, preferably demountably, to the first core member 8 by any suitable apparatus and method including for example screws, bolts, nuts, pins, welding, and the like.

The second chuck 6 has a similar configuration to the first chuck 4. The second chuck 6 is comprised of a second core member 28 having a top end 30 and a bottom end 32, a second inflatable tube 34 disposed around the second core member 28, a second passageway 36 defined by the second core member which is in communication with the interior surface of the second tube 34. The bottom end 38 of the second tube is folded back inwardly toward the top end 40 of the second tube to form a folded portion. The second chuck 6 further comprises means for hermetically coupling the top end 40 of the second tube to the second core member, such means including for example clamp ring 42, and means for hermetically coupling the bottom end 38 of the second tube to the second core member with the bottom end 38 of the second tube preferably being constrained only at the folded portion, such means including for example clamp ring 44.

An adapter member 46 is provided having a third passageway 48 and having on its surface a flange portion 50 for engaging an end of a hollow substrate. One end of the adapter member 46 is coupled to the top end 10 of the first core member and the other end of the adapter member is coupled to the bottom end 32 of the second core member. The third passageway 48 is in communication with the first passageway 16 and the second passageway 36. O-rings (52, 54) provide a fluid tight seal. The adapter member is coupled, preferably demountably, to the first core member and the second core member by any suitable apparatus and method including for example screws, bolts, nuts, pins, welding, and the like.

A hollow shaft 56 defining passageway 58 is coupled, preferably demountably, to the top end 30 of the second core member by any suitable apparatus and method including for example screws, bolts, nuts, pins, welding, and the like. A flange member 60 is mounted on the shaft 56 to engage an end of a hollow substrate. A cap screw 62 couples the flange member 60 to the shaft 56. Preferably, the position of the flange member on the shaft is adjustable to correspond to substrates of differing lengths. The end of the shaft 56 including a portion of the length of the shaft may be disposed inside the sleeve 64. A locking collar 66 and cap screws 62 releasably prevent movement of the shaft inside the sleeve. The length of the shaft 56 extending outside of the sleeve 64 is adjustable by loosening the locking collar 66, moving a length of the shaft 56 into or out of the sleeve 64, and then tightening the locking collar 66. In this way, the length of the universal substrate holding apparatus is adjustable.

Disposed in shaft passageway 58 are an outer tubing 68 for conveying a first fluid and an inner tubing 70 for conveying a second fluid coaxial within the outer tubing 68, wherein there is defined between the outer surface of the inner tubing and the inner surface of the outer tubing a gap 72 for the passage of the first fluid. One end of the outer tubing 68 is coupled to the top end 30 of the second core member via for example a hollow male connector 74, wherein the gap 72 is in communication with the second passageway 36. One end of the male connector 74 may be threaded to couple with the second core member and the other end of the connector may have an O-ring (not shown) dimensioned to fit around the outer tubing. The inner tubing 70 extends into the second passageway 36 and an end of the inner tubing is coupled to the adapter member 46 via for example a hollow male connector 76, wherein the opening of the inner tubing is in communication with the third passageway 48 and the first passageway 16. One end of the male connector 76 may be threaded to couple with the adapter member and the other end of the connector may have an O-ring (not shown) dimensioned to fit around the inner tubing. The second passageway 36, the third passageway 48, the male connectors (74, 76), the inner tubing 70, and the outer tubing 68 preferably have a configuration and dimension such that the first fluid conveyed by the outer tubing 68 does not enter the third passageway 48 of the adapter member, so that preferably the only fluid inflating the first tube 14 is the second fluid conveyed by the inner tubing 70, and the second fluid conveyed by the inner tubing preferably does not inflate the second tube 34. The first fluid and the second fluid may be the same or different fluid and preferably may be a gas such as air, nitrogen, oxygen, and the like.

Figure 2:
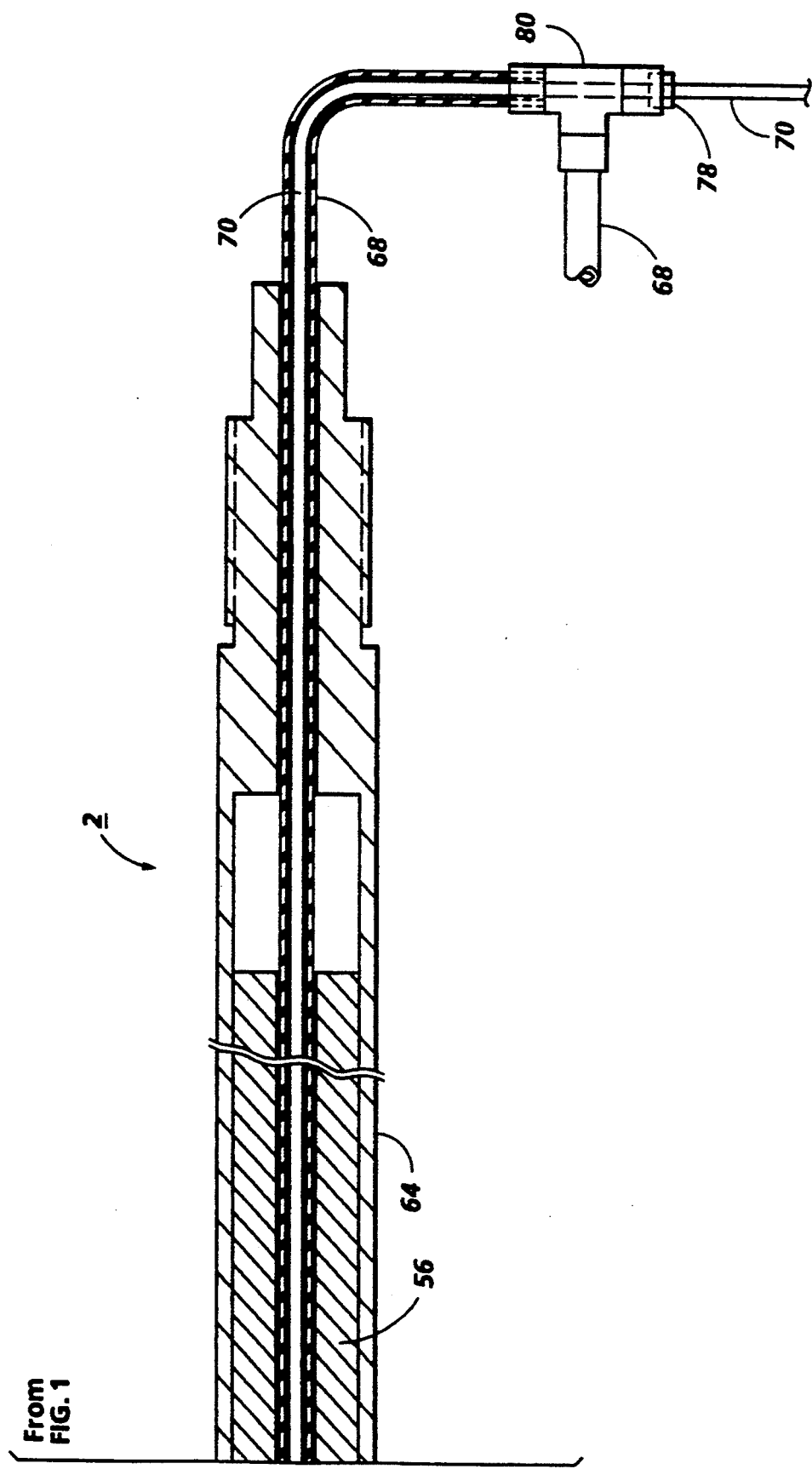
FIG. 2 illustrates a plan, schematic, cross-sectional view of the portion of the universal substrate holding apparatus not disclosed in FIG. 1.

FIG. 2 shows the remaining portion of the universal substrate holding apparatus 2 above the locking collar 66 of FIG. 1. Shaft 56 is disposed in sleeve 64. The inner tubing 70 and the outer tubing 68 are coupled to a Tee adapter 80 to facilitate fluid injection of the first fluid only into the outer tubing and the second fluid only into the inner tubing. An expander 78 may be used to couple the inner tubing 70 to the Tee adapter 80. A three-way ball valve (not shown) may be employed to switch fluid injection between the inner tubing and the outer tubing.

The universal substrate holding apparatus may be employed as follows to hold sequentially (i.e., not simultaneously) for example two substrates having different cross-sectional dimensions. Assuming for the sake of illustration that the first chuck 4 is sized to hold the inner surface of a smaller hollow substrate having a cross-sectional dimension of 30 mm, where there is a clearance of about 2.5 mm between the inner substrate surface and the first inflatable tube. Assuming also for the sake of illustration that the second chuck 6 is sized to hold the inner surface of a larger hollow substrate having a cross-sectional dimension of 84 mm, where there is a clearance of about 10 mm between the inner substrate surface and the second inflatable tube. The guide member 26 directs the first chuck into the smaller substrate. Movement of the first chuck 4 continues into the substrate until an end of the substrate contacts the flange portion 50. Fluid is injected into the inner tubing 70 which enters the first passageway 16 to inflate the first tube 14 to contact the inner surface of the substrate, resulting in the first chuck holding the substrate. The first chuck positions the substrate for processing such as dip coating. The inflated first chuck preferably seals the inside of the substrate, thereby preventing or minimizing the coating of the inside of the substrate. After processing of the substrate, the first tube 14 is deflated by withdrawing fluid from the first passageway, thereby releasing the substrate. The first chuck is then withdrawn from inside the substrate. Operation of the second chuck 6 proceeds in a similar manner. Movement of the first chuck 4, adapter member 46, and the second chuck 6 into the larger substrate continues until the end of the substrate contacts the flange member 60. Fluid is injected into the outer tubing 68 which enters the second passageway 36 to inflate the second tube 34 to contact the inner surface of the substrate, resulting in the second chuck holding the substrate. The second chuck positions the substrate for processing such as dip coating. The inflated second chuck preferably seals the inside of the substrate, thereby preventing or minimizing the coating of the inside of the substrate. After processing of the substrate, the second tube 34 is deflated by withdrawing fluid from the second passageway, thereby releasing the substrate. In embodiments of the instant invention, the first chuck and/or the second chuck are detachable from the universal substrate holding apparatus and they may be replaced with similarly configured chucks of different dimensions to hold substrates which were either too large or too small for the original chucks.

The first chuck and the second chuck may have a cylindrical shape, and may have any suitable outer cross-sectional dimension. The first chuck may have an outer cross-sectional dimension ranging for example from about 20 to about 60 mm, and preferably from about 30 to about 40 mm. The second chuck may have an outer cross-sectional dimension ranging for example from about 60 to about 200 mm, and preferably from about 70 to about 100 mm. The clearance between the first tube of the first chuck and the inner surface of the substrate may range for example from about 1 to about 8 mm, and preferably from about 2 to about 6 mm. For a substrate having a diameter of 40 mm, a clearance of about 5.5 mm is especially preferred. For a substrate having a diameter of 30 mm, a clearance of about 2.5 mm is especially preferred. The clearance between the second tube of the second chuck and the inner surface of the substrate may range for example from about 3 to about 15 mm, and preferably from about 5 to about 10 mm. For a substrate having a diameter of 84 mm, a clearance of about 10 mm is especially preferred. In embodiments of the instant invention, the clearance between the substrate and the first chuck or the second chuck may exceed the clearance of conventional chucks by an amount ranging for example from about 2 to about 8 mm. The minimal amount of chuck clearance in conventional chucks may increase the likelihood of chuck failures due to for example poor chuck release. The first core member and the second core member preferably are rigid and may be fabricated of any suitable material including a metal such as steel, iron, aluminum, copper, and the like The first inflatable tube and the second inflatable tube may be fabricated of any suitable material including a synthetic material such as rubber, preferably chloroprene, optionally incorporating reinforcing cords. The reinforcing cords preferably are organic fibers such as nylon, polyester fibers, and the like. The first tube and the second tube may have any suitable thickness, ranging for example from about 2 to about 15 mm, and preferably from about 4 to about 8 mm.

The first chuck and the second chuck may be modified versions of commercially available chucks from Firestone Industrial Products Company which are sold under the tradename AIRPICKER ®. Chucks similar to the first chuck and the second chuck are disclosed in Fukuyama et al., U.S. Pat. No. 4,783,108, the disclosure of which is totally incorporated by reference. To convert Firestone AIRPICKER ® chucks such as model Nos. PO17TR, PO19TR, PO22TR, and/or PO25TR into the first chuck 4 of the instant invention, the following representative modifications may be made: (1) one M5 (metric screw thread designation)×9.0 mm deep threaded hole on the bottom of the AIRPICKER ® chuck; and (2) one 13.0 mm counter bore by 1.0 mm deep on the bottom of the AIRPICKER ® chuck. To convert Firestone AIRPICKER ® chucks such as model Nos. PO45T and/or PO55T into the second chuck 6 of the instant invention, the following representative modifications may be made: (1) overall length may be reduced from 100.07 mm to 69.85 mm; (2) one ⅛ inch National Pipe Thread on the top of the AIRPICKER ® chuck; (3) one 11.11 mm bore×25.40 mm deep on the bottom end of the AIRPICKER ® chuck; (4) one 44.46 mm counterbore×2.0 mm deep on the bottom end of the AIRPICKER ® chuck; and two M4 (metric screw thread designation)×8.0 mm threaded holes on the bottom end of the AIRPICKER ® chuck.

The inner tubing and the outer tubing may be of any suitable dimension. For example, the inner tubing may have an outside diameter of about ⅛ inch and a wall thickness of about 1/16 inch. The outer tubing may have for example an outside diameter of about ¼ inch and a wall thickness of about 1/16 inch.

Any suitable fluid pressure may be used to inflate the first tube and the second tube. For example, to inflate the smaller first tube, a fluid pressure ranging for example from about 60 to about 80 psi, and preferably about 70 psi, may be employed. For example, to inflate the larger second tube, a fluid pressure ranging for example from about 30 to about 50 psi, and preferably about 40 psi, may be employed.

The substrates which may be held by the instant apparatus may have a cross-sectional dimension ranging for example from about 10 to about 200 mm, and preferably from about 30 to about 90 mm, and especially 30, 40, and 84 mm. Unless other noted, the dimensions indicated herein for the substrate refer to an outside diameter. The substrates have a wall thickness preferably ranging from about 0.6 mm to about 2.0 mm.

Other modifications of the present invention may occur to those skilled in the art based upon a reading of the present disclosure and these modifications are intended to be included within the scope of the present invention.

I claim:

1. An apparatus comprising:
   (a) a first core member having a top end and a bottom end;
   (b) a first inflatable tube disposed around the first core member;
   (c) a first passageway defined by the first core member in communication with the interior surface of the first tube;
   (d) a second core member having a top end and a bottom end, a portion of the second core member having a larger outer cross-sectional dimension than the first core member, wherein the top end of the first member is associated with the bottom end of the second member;
   (e) a second inflatable tube disposed around the second core member, a portion of the second tube having a larger outer cross-sectional dimension than the first tube, and whereby the second tube is disposed in tandem with the first tube; and
   (f) a second passageway defined by the second core member in communication with the interior surface of the second tube, further comprising an adapter member having two ends and defining a third passageway, wherein one end of the adapter member is coupled to the top end of the first core member and the other end of the adapter member is coupled to the bottom end of the second core member, and the third passageway is in communication with the first passageway and the second passageway, and wherein the surface of the adapter member defines a flange portion which can engage an end of a hollow substrate.

2. The apparatus of claim 1, further comprising a conically-shaped guide member coupled to the bottom end of the first core member.

3. The apparatus of claim 1, wherein the first tube and the second tube comprise rubber.

4. The apparatus of claim 1, wherein the second core member has a larger outer cross-sectional dimension along its entire length than the first core member.

5. The apparatus of claim 1, wherein the second tube has a larger outer cross-sectional dimension along its entire length than the first tube.

6. The apparatus of claim 1, further comprising means for hermetically coupling the top end of the first tube to the first core member, the bottom end of the first tube being folded back inwardly toward the top end of the first tube to form a folded portion, and further comprising means for hermetically coupling the bottom end of the first tube to the first core member with the bottom end of the first tube being constrained only at the folded portion.

7. The apparatus of claim 1, further comprising means for hermetically coupling the top end of the second tube to the second core member, the bottom end of the second tube being folded back inwardly toward the top end of the second tube to form a folded portion, and further comprising means for hermetically coupling the bottom end of the second tube to the second core member with the bottom end of the second tube being constrained only at the folded portion.

8. An apparatus comprising:
(a) a first core member having a top end and a bottom end;
(b) a first inflatable tube disposed around the first core member;
(c) a first passageway defined by the first core member in communication with the interior surface of the first tube;
(d) a second core member having a top end and a bottom end, a portion of the second core member having a larger outer cross-sectional dimension than the first core member, wherein the top end of the first member is associated with the bottom end of the second member;
(e) a second inflatable tube disposed around the second core member, a portion of the second tube having a larger outer cross-sectional dimension than the first tube, and whereby the second tube is disposed in tandem with the first tube; and
(f) a second passageway defined by the second core member in communication with the interior surface of the second tube, wherein the first passageway and the second passageway are in communication, and further comprising an outer tubing for conveying a first fluid and an inner tubing for conveying a second fluid coaxial within the outer tubing, wherein there is defined between the outer surface of the inner tubing and the inner surface of the outer tubing a gap for passage of the first fluid, wherein one end of the outer tubing is associated with the top end of the second core member and the gap is in communication with the second passageway, and a portion of the inner tubing is disposed in the second passageway, wherein an end of the inner tubing is associated with the top end of the first core member, and wherein the opening of the inner tubing is in communication with the first passageway.

9. An apparatus comprising:
(a) a first core member having a top end and a bottom end;
(b) a first inflatable tube disposed around the first core member;
(c) a first passageway defined by the first core member in communication with the interior surface of the first tube;
(d) a second core member having a top end and a bottom end, a portion of the second core member having a larger outer cross-sectional dimension than the first core member, wherein the top end of the first member is associated with the bottom end of the second member;
(e) a second inflatable tube disposed around the second core member, a portion of the second tube having a larger outer cross-sectional dimension than the first tube, and whereby the second tube is disposed in tandem with the first tube; and
(f) a second .passageway defined by the second core member in communication with the interior surface of the second tube, and further comprising: an at least partially hollow sleeve and a hollow shaft having two ends, wherein one end of the shaft is associated with the top end of the second core member and the other end of the shaft, including a portion of the length of the shaft is disposed inside the sleeve.

10. The apparatus of claim 9, further comprising a flange member, coupled to the outer surface of the shaft, for engaging an end of a hollow substrate.

* * * * *